Figure 1:
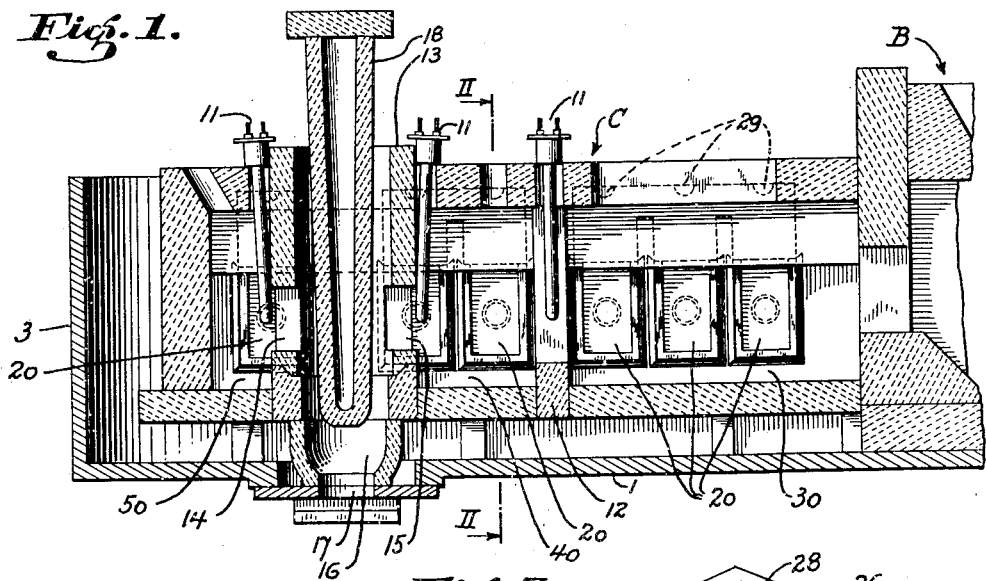

Sept. 26, 1933. K. M. HENRY ET AL 1,928,289
BLISTER TRAP FOR GLASS FURNACES
Filed May 31, 1930

INVENTORS.
Kenneth M. Henry,
Burton A. Noble.
BY
Townsend, Loftus & Abbett
ATTORNEYS.

Patented Sept. 26, 1933

1,928,289

UNITED STATES PATENT OFFICE 1,928,289

BLISTER TRAP FOR GLASS FURNACES

Kenneth M. Henry and Burton A. Noble, San Francisco, Calif., assignors, by mesne assignments, to Hartford-Empire Company, Hartford, Conn., a corporation of Delaware Application May 31, 1930. Serial No. 458,504

4 Claims. (Cl. 13—6)

This invention relates to glass furnaces and particularly to blister traps for use in connection with a fore-hearth or boot of a glass furnace such as disclosed in a co-pending application entitled Forehearth for molten glass and method of controlling the temperature of the glass therein, filed April 29, 1930, Serial Number 448,241.

In the above named application a glass furnace fore-hearth is shown through which molten glass flows to the discharge orifice from which it is discharged in the form of gobs. The molten glass is increased in temperature during its passage through the fore-hearth by placing pairs of electrodes in the opposite sides of the fore-hearth, the body of glass flowing between the electrodes functioning as a resistance medium when an electric current is applied.

In actual practice difficulty was encountered to the extent that streaks of blisters or bubbles were found in the gob and in the finished glassware. Investigation disclosed that the glass was superheated at points adjacent the electrode faces and that the temperatures produced were sufficient to cause liberation of a sufficient amount of gas to form bubbles. The temperature of the glass adjacent the faces of the electrodes was found to be approximately 200° F. hotter than the glass approximately one inch away, this high temperature being probably caused either by contact resistance or the resistance of the electrode coating. This extreme temperature destroys the existing equilibrium of the gas dissolved in the glass with the result that gas is evolved and being caught in the relative viscous glass is retained as bubbles or blisters.

There apparently is only one possible method of obtaining a blister free finished product when using an electric heating system of the character described and that is to provide means for removing the blisters when formed, thereby preventing the blisters from reaching or appearing in the finished product.

The present application is concerned with a method of that character. The object of the invention is to trap and remove the blisters as rapidly as they are formed, thus preventing them from reaching or appearing in the finished product. The invention briefly stated consists in forming trap chambers adjacent and above the electrode faces; in providing means for directing the blisters into said chambers; in maintaining the glass in the chambers at a sufficiently high temperature to permit the blisters to freely rise and burst so as to be completely dispersed as they reach the surface of the glass and in providing means for discharging the gas thus liberated.

The invention is shown by way of illustration in the accompanying drawing, in which—

Figures 2, 3:
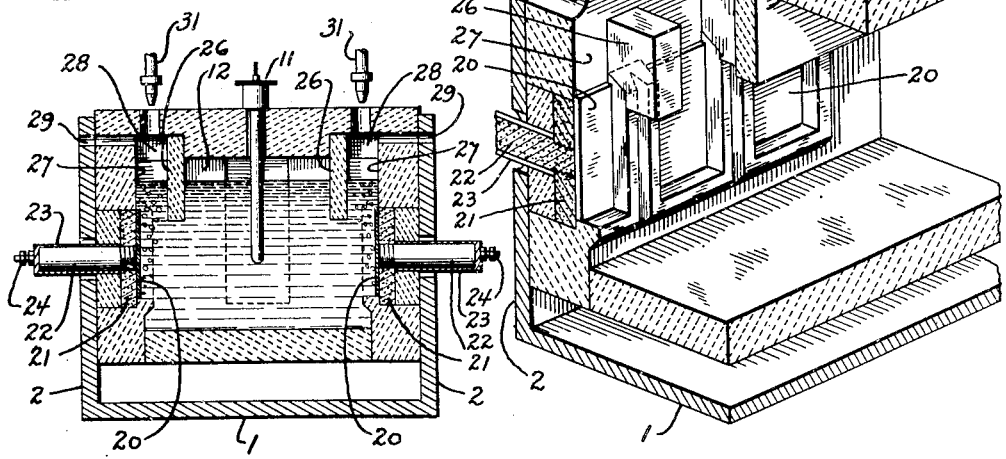

Fig. 1 is a central vertical longitudinal section through a portion of a fore-hearth embodying the invention, Fig. 2 is a cross section taken on line II—II of Fig. 1, and Fig. 3 is a perspective view of a section of a fore-hearth showing the construction and position of the blister traps.

Referring to the drawing in detail and particularly Figs. 1 and 2, a fore-hearth is shown which consists of a trough which may be of cast iron or other strong heat resistant material comprising a bottom section 1, side sections 2, and a front or end section 3. This trough or boot as it is commonly called is lined with a refractory material such as clay or the like which resists the action of glass and heat. The boot is supported adjacent a melting furnace (not shown) and is divided into a cooling section B and a heating section C. Glass flowing from the melting furnace is cooled in the section B and heated to the proper temperature for molding as it passes through the section C. The heating section is, in this instance, divided into three zones indicated at 30, 40, and 50. Each zone is provided with a thermo-couple such as shown at 11 for the purpose of determining and regulating the temperature of the molten glass as it passes through each zone.

In the space between the zones 30 and 40 is placed a deflector block 12 which functions to prevent stratification of the glass. Between zones 40 and 50 but not completely separating them is placed a cylinder such as indicated at 13. This cylinder is constructed of clay or a like refractory material and it is provided with one or more inlet ports such as indicated at 14 and 15. The molten glass enters through these ports and flows downwardly into a bowl such as shown at 16 and finally discharges through an orifice indicated at 17 where it is cut off by shears or the like to form the gobs which are delivered to the molds. Cylinder 13 surrounds the plunger 18 which has its usual function, the cylinder being open at the top to permit insertion of the plunger.

The temperature of the glass entering the cylinder 13 to be discharged into the mold is controlled by current passing between the electrodes 20 placed in the side walls of the boot. The electrodes are arranged in pairs, one on each side of the boot. The zone 30 is provided with three pairs of electrodes, zone 40 with two pairs and zone 50 with one pair. The number of zones and electrodes employed, however, will be governed by the size of the boot and other relative conditions. Each of the electrodes shown consists of a graphite plate, such as indicated at 21, into which is screwed a graphite rod 22. A metal tube 23 is shrunk around the graphite rod to strengthen the same and also to serve as a mounting for the electrical terminals indicated at 24.

When the furnace here shown was first placed in operation difficulty was encountered to the extent that the gobs discharged were found to contain streaks of blisters or bubbles. Inspection showed that the bubbles were generated at the electrode faces and research determined that the bubbles were evolved by a superheating of the glass adjacent the faces of the electrodes. In fact it was found that the temperature of the glass adjacent the electrode faces was approximately 200° F. above that of the glass approximately one inch away and that the high temperature was probably produced either by contact resistance or the resistance of an electric coating material applied to the faces of the electrodes. The high temperature of the glass apparently destroyed the existing equilibrium of the gas dissolved in the glass with the result that gas was evolved and, being caught in the relatively viscous glass, was retained as bubbles or blisters. The blisters would thus be visibly present resulting in defects in the finished glass product. It is the removal of these blisters with which the present invention is particularly concerned.

It is accomplished by arranging blister traps above and adjacent the electrodes. The essential features of the traps are the provision of a projecting lip or baffle plate such as indicated at 26 which projects downwardly into the glass. The lower edge of the lip is below the upper edge of the electrode. The lip forms the outer edge of a compartment which is the width of the electrode. The inside wall 27 of the blister trap is flush with the face of the electrodes 20 and comprises part of the lining wall of the boot. Each electrode has its own blister trap but all are interconnected by a channel 28 and this channel is provided with a plurality of discharge openings 29 leading to the atmosphere.

When the boot is in operation the blisters travel upwardly on the faces of the electrodes and into the traps. The glass above the electrodes has a higher temperature than elsewhere in the glass stream and consequently has a lower viscosity. Due to the lower viscosity, the blisters rise upwardly on the electrode face as they are formed, and reach the surface within the blister trap chamber. Because of the high temperature, due to the localized superheated zone and the insulation which retains this heat, the blisters burst and completely disperse as they reach the surface. The gas discharged from the bubbles passes through the channel 28 and out to the atmosphere through openings 29. If openings 29 were not present gas pressure would develop in the traps and the blisters would be forced down and under the lip 26 and from there into the main stream of glass, this being of course avoided by permitting the gas to escape to the atmosphere as quickly as the blisters are formed. Another method of moving the gas liberated would be that of connecting the openings 29 with some source of reduced pressure and thus facilitate the removal of the blisters by allowing the then relatively increased pressure within the bubbles to more readily burst the skin of glass surrounding the same. This however has not been found necessary in practice. The communicating channel indicated at 28 is designed to receive a gas burner such as shown at 31. Such a burner heats up the surface of the glass in the traps and thus lowers viscosity of the glass permitting escape of the bubbles. Such a burner may be supplanted by any convenient form of heating apparatus as the function of the burner is merely that of raising the temperature of the glass in the blister traps so as to reduce the viscosity of the glass and by reducing the viscosity of the glass, particularly at a point adjacent its surface, the resulting blisters are caused to move more rapidly and burst more readily.

While certain features of the present invention are more or less specifically described, we wish it understood that various changes may be resorted to within the scope of the appended claims. Similarly, that the materials and finishes of the several parts employed may be such as the manufacturer may decide, or varying conditions or uses may demand.

Having thus described our invention, what we claim and desire to secure by Letters Patent is—

1. Apparatus for the introduction of electric current into molten glass, comprising a container through which a body of molten glass is adapted to flow, submerged electrodes for passing an electric current through the glass and thereby increasing its temperature, baffles disposed within the container for separating the glass adjacent to each of said electrodes from the main body of glass, and auxiliary heating means for the glass separated by said baffles for reducing its viscosity and aiding in the release of bubbles of gas liberated by the glass.

2. Apparatus for the introduction of electric current into molten glass, comprising a container through which a body of molten glass is adapted to flow, submerged electrodes for passing an electric current through the glass and thereby increasing its temperature, a baffle disposed within the container for separating the glass adjacent to each of said electrodes from the main body of glass, auxiliary heating means for the glass separated by said baffle for reducing its viscosity and aiding in the release of bubbles of gas liberated by the glass, and means for discharging the gases so released.

3. In a device of the character described, a container for molten glass, electrodes disposed in the walls of said container for heating the glass, baffles arranged in said container and extending into the molten glass adjacent to the electrodes for trapping bubbles of gas liberated by the glass adjacent the faces of the electrodes, and auxiliary means for heating the glass separated by said baffles to facilitate the release of the bubbles, said container having ports formed therein for the exit of gas liberated by the bursting of said bubbles on the surface of the glass.

4. In a fore-hearth having a bottom, side walls and a top, electrodes disposed in said side walls for heating molten glass flowing through the forehearth, baffles carried by the top and extending down into the glass in front of the electrodes for separating bubbles of gas liberated by the glass adjacent to the faces of the electrodes, heating means in the top of the container between the baffles and the side walls for facilitating the bursting of said bubbles, said side walls having ports formed therein for the exit of gases formed by the bursting of the bubbles.

KENNETH M. HENRY.
BURTON A. NOBLE.